United States Patent [19]

Kokkonen et al.

[11] Patent Number: 5,002,743
[45] Date of Patent: Mar. 26, 1991

[54] PROCESS FOR THE REMOVAL OF SULFUR DIOXIDE FROM HOT FLUE GASES

[75] Inventors: Kari Kokkonen, Tampere; Seppo Tuominiemi, Pirkkala; Hannu Alppi; Timo Kenakkala, both of Tampere, all of Finland

[73] Assignee: Oy Tampella Ab, Tampere, Finland

[21] Appl. No.: 429,564

[22] Filed: Oct. 31, 1989

[30] Foreign Application Priority Data

Oct. 31, 1988 [FI] Finland ............................ 885003

[51] Int. Cl.$^5$ .......................... B01J 8/00; C01B 17/00
[52] U.S. Cl. .................................... 423/244; 423/242
[58] Field of Search ............... 423/242 A, 242 R, 243, 423/244 A, 244 R

[56] References Cited

U.S. PATENT DOCUMENTS

| | | | |
|---|---|---|---|
| 3,411,864 | 11/1968 | Pallinger | 423/244 A |
| 4,309,393 | 1/1982 | Nguyen | 423/242 A |
| 4,559,211 | 12/1985 | Feldman et al. | 423/242 A |
| 4,788,047 | 11/1988 | Hamala et al. | 423/244 |
| 4,867,955 | 9/1989 | Johnson | 423/242 A |

FOREIGN PATENT DOCUMENTS

WO/04196 6/1988 PCT Int'l Appl. .

*Primary Examiner*—Gregory A. Heller
*Attorney, Agent, or Firm*—Dressler, Goldsmith, Shore, Sutker & Milnamow, Ltd.

[57] ABSTRACT

The invention relates to a process for the removal of sulfur dioxide from hot flue gases (8) which have been obtained by burning a sulfur-containing substance (4) in a boiler (1). In the process, a substance (6), such as lime or limestone, which reacts with sulfur dioxide to form a solid product is fed into the boiler or into the reaction zone (2) subsequent to the boiler, the hot flue gases (8) are cooled in the reaction zone (2) by feeding into it at maximum such an amount of water as the hot flue gases are capable of evaporating, and the substantially dry solid products are separated (3) in the form of dust (10) from the cooled flue gases. According to the invention, the flue gases (11) thus obtained are scrubbed (13) with an alkaline aqueous solution (15) in order to remove the remaining sulfor dioxide and dust from the flue gases, and part (9') of the cycled scrubbing solution (9) is fed into the boiler (1) or the reaction zone (2) in order to evaporate the water from this solution.

2 Claims, 1 Drawing Sheet

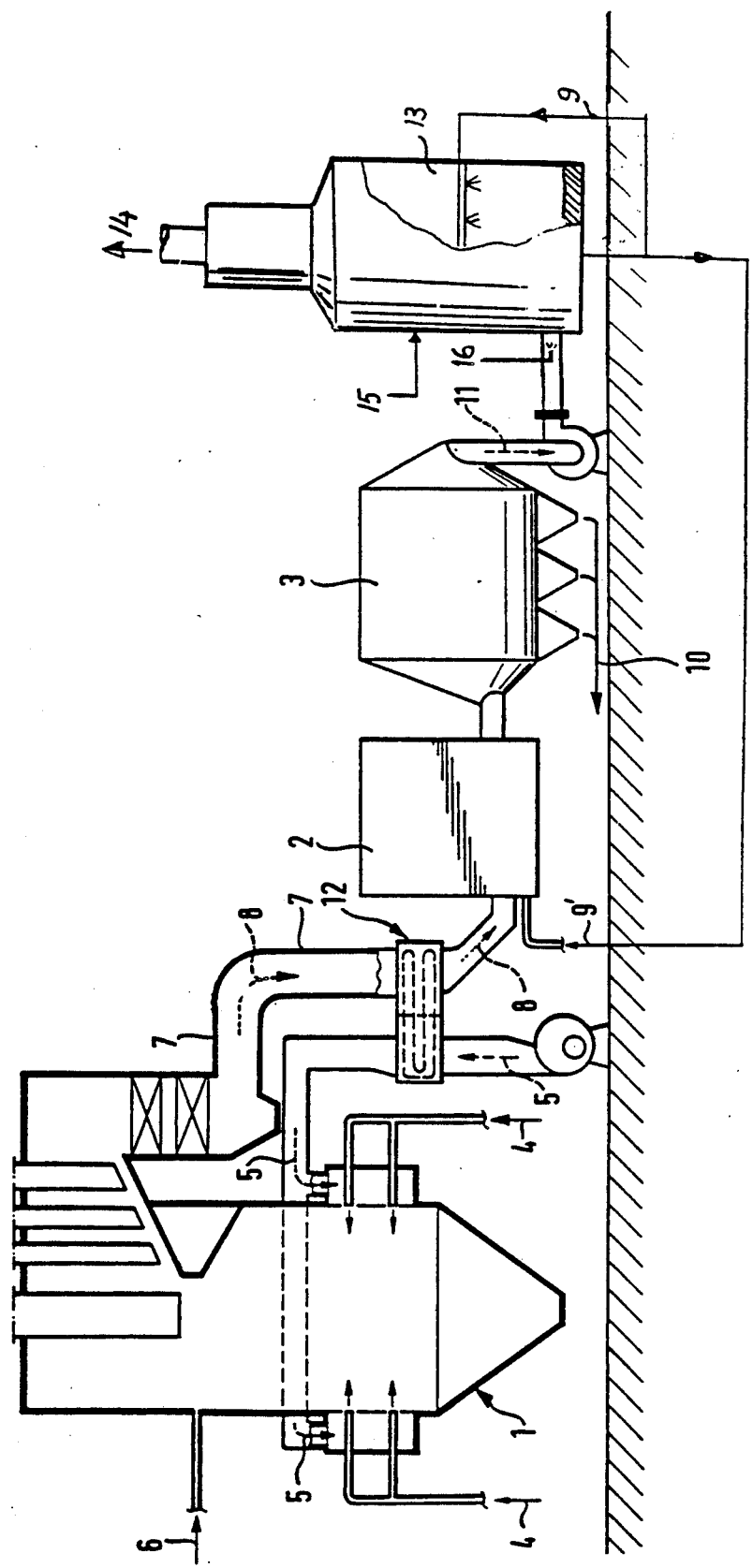

PROCESS FOR THE REMOVAL OF SULFUR DIOXIDE FROM HOT FLUE GASES

The present invention relates to a process for the removal of sulfur dioxide and other gaseous sulfur compounds from hot flue gases produced in the burning of a sulfur-containing fuel in a boiler or the like.

There are previously known numerous processes for removing from flue gases the gaseous sulfur compounds, and specifically sulfur dioxide, produced in connection with the burning of sulfur-containing fuels. The processes for the removal of sulfur dioxide from hot flue gases can be divided roughly into three categories, namely dry, semi-dry and wet processes.

In dry processes, the sulfur dioxide content in the boiler flue gases is reduced by feeding calcium oxide, calcium carbonate or some other alkaline compound into the combustion chamber of the boiler. In a fluidized-bed furnace having a fluidized bed the sulfur dioxide content in the flue gases can be decreased by as much as 90% by an addition of lime, when the boiler is operated within a temperature range optimal for the chemical reactions, namely 800°-1000° C. The sulfur dioxide thus absorbed emerges the boiler, together with the fly ash, in the form of gypsum ash.

In other boilers, in which temperatures higher than the above must be used and in which the retention of the additive is short owing to the character of the combustion, it is to be expected that the decrease in the sulfur dioxide content in the flue gases remains substantially lower, approximately 50% or under, and so the dry process has not been applied to such boilers on an industrial scale.

On the other hand it is known that the sulfur dioxide content in flue gases can be decreased by various absorption processes outside the boiler. One such process, known per se, is the so-called spray process, in which the flue gases emerging from the boiler are fed into a separate reactor, into which an aqueous slurry of calcium hydroxide is sprayed in small drops through special nozzles. The reactor is typically a rather large vessel in which the velocity of the flue gases is allowed to decrease and the aqueous slurry is injected downward from above from the upper section of the vessel. The temperature in the reactor is at this time approximately 50°-80° C., and the control of the spraying of the aqueous calcium hydroxide slurry is very important, because drops which are too large will remain wet on the reactor bottom. Efforts are made to maintain the thickness of the aqueous slurry of calcium hydroxide so high that the heat present in the flue gases will suffice to evaporate the water entering the reactor, so that the absorption product can be recovered in the form of a dry powder. By a semi-dry process such as this it is possible to remove up to 90% of the sulfur dioxide. The disadvantages of the process to be pointed out include the proneness of the nozzles to become clogged, the extra preparation and batching devices for the aqueous slurry of calcium hydroxide, which increase the investment costs, and the difficulties in controlling the drop size in the spray.

In the LIFAC process developed by Oy Tampella Ab, the above disadvantages have been eliminated by not activating the oxides of calcium and magnesium, inactive in terms of sulfur dioxide removal, until in situ in the flue gases by means of water or water vapor, whereupon they are converted to the corresponding hydroxides and react with sulfur dioxide to form a solid sulfate/sulfite mixture, which can thereafter be removed effectively from the flue gases by physical separating means such as electric filters or hose filters. When the absorbent is fed separately as a powder into the combustion chamber or directly into the reaction zone, it need not be fed as a slurry through nozzles, whereby the clogging of nozzles and the use of extra slurry preparing and batching devices is eliminated. If it is desired to recover the absorption product as a substantially dry powder, water is used in the injection in only such an amount that the thermal energy of the flue gases and the heat of reaction are capable of vaporizing it.

In a prior known wet process the sulfur-containing flue gases are fed into a scrubber, in which the flue gases are scrubbed with an alkali-containing solution. The gas scrubber developed by Oy Tampella Ab (FI Patent 58443) is highly usable for this purpose; it comprises a tower filled with packing pieces, with an inlet pipe for the gas to be scrubbed and an outlet pipe for the scrubbing solution connected to its lower section, and with an outlet pipe for the scrubbed gas and a scrubbing solution distribution system connected to its upper section. By a suitable selection of the ratio of the height of the packing-piece layer to its diameter and by the use of a trickling system without spray nozzles, distributed over the entire cross-sectional area of the scrubber, a packing-piece tower is obtained in which even very large quantities of flue gases can be treated.

All of the processes mentioned above have their advantages and disadvantages. The disadvantages of the wet process include the fact that the absorbent used, usually sodium hydroxide, is expensive, and furthermore, the product obtained is a sodium sulfate solution which must be treated further in order to bring the sodium sulfate into a solid form. The greatest advantage of the wet process is the high degree of reduction achieved by it, i.e. by using it the sulfur dioxide can be removed quite thoroughly from the flue gases. In addition, even the remaining dust can be removed by means of it from the flue gases, if the wet scrubber is placed at a point after an electric filter or a hose filter. Compared with the wet process, the dry and semi-dry processes have the disadvantage of a low degree of reduction, which can be increased by increasing the excess of lime, which, however, increases the amount of dust to be separated and produces large amounts of residue. The advantage of these processes is, on the other hand, that a dry product is obtained which need not be treated further and, in addition, the lime used as the absorbent is inexpensive.

The object of the present invention is now to provide a process for the removal of sulfur dioxide from hot flue gases, the process having the advantages, but not the disadvantages, of the above-mentioned processes known per se. It is an object also to provide a process with moderate investment and operating costs. It is thus the object of the present invention to provide a process for the removal of sulfur dioxide from hot flue gases which have been obtained by burning a sulfur-containing substance in a boiler, in which process a substance which reacts with sulfur dioxide to form a solid product is fed into the boiler or a reaction zone subsequent to it, the hot flue gases are cooled in the reaction zone by feeding into it at maximum as much water as the hot flue gases are capable of evaporating, and by separating the substantially dry solid products from the cooled flue gases, i.e. a process in which, by using a moderate lime excess, a high degree of reduction is accomplished and the sulfur-containing reaction products can be separated from the flue gases in the form of a dry and solid residue which requires no further treatment.

The present invention is based on a combination of a semidry process and a wet process, wherein cooled and filtered flue gases are further scrubbed with an alkaline aqueous solution in order to remove the remaining sulfur dioxide and dust from the flue gases and wherein part of the cycled scrubbing solution is directed to the boiler or the reaction zone in order to evaporate the water from this solution, whereupon the final product obtained is a dry and solid mixture of sodium and calcium sulfate/sulfite, if the substance used for reacting with sulfur dioxide to form a solid product is lime or limestone and the alkaline aqueous solution used is an aqueous solution of sodium hydroxide.

By the process according to the present invention it is possible to adjust the reaction conditions in the reaction zone so as to be optimal with respect to the temperature and the lime excess used, since it is not necessary to raise artificially the degree of reduction; the final degree of reduction is accomplished simply by scrubbing with a small amount of an alkaline aqueous solution the flue gases emerging from the dry dust separator, in order to remove the remaining sulfur dioxide and dust from the flue gases. The scrubbing solution removed from the scrubber need not separately be treated further; it is directed either to the boiler or directly to the reaction zone, where the water present in it evaporates, thereby cooling the flue gases and possibly activating the calcium oxide present in the flue gases into calcium hydroxide, which reacts in situ with the sulfur dioxide present in the flue gases. Since most of the sulfur dioxide has already been removed from the flue gases entering the scrubber, only a very small amount of expensive alkali needs to be used in the scrubber; nevertheless, with this small amount the degree of reduction can be raised as high as by wet limestone or by regenerative processes, and, additionally, even the rest of the dust can be removed from the flue gases before they are directed into the flue.

By the process according to the invention, the reaction between the substance reacting with sulfur dioxide to form a solid product and sulfur dioxide in the reaction zone can be carried out at a temperature so high (at a lower degree of reduction) that the gases no longer need to be reheated, in order to prevent the corrosion of the filter, before they are fed into the electric filter.

The invention is described below with reference to the accompanying drawing, which depicts diagrammatically an apparatus suitable for carrying out the process according to the invention.

BRIEF DESCRIPTION OF THE DRAWING

In the drawing, the boiler in general indicated by reference numeral 1. A sulfur-containing substance 4 to be burned, a usually pre-heated, oxygen-containing gas 5, and an oxide or preferably carbonate 6 of calcium, magnesium in excess in proportion to the sulfur dioxide gas produced in the combustion chamber are fed into the combustion chamber of the boiler 1. By "in excess" is meant in this context that the amount of calcium, magnesium or calcium and magnesium contained in the oxide or carbonate of calcium, magnesium is greater than would in theory in accordance with the reaction formula be needed to react with all of the sulfur fed into the combustion chamber. In the process according to the invention the Ca/S molar ratio can be maintained at a rather low level, at a value of approximately 2.

The carbonate fed into the boiler decomposes in the boiler into oxide and carbon dioxide. The oxide for its part may react with sulfur dioxide, forming first sulfite and thereafter, when oxidizing, sulfate. Owing to the short retention time in the boiler, only part of the oxide has time to react with the sulfur dioxide at a temperature sufficiently high for the reaction, and therefore flue gases 8 which contain calcium oxide and/or magnesium oxide and also still contain unabsorbed sulfur dioxide leave the combustion chamber of the boiler through the flue gas conduit 7. Pulverous oxide may additionally or alternatively be fed directly into the flue gas conduit 7 or into the reactor 2 subsequent to it. The temperature of the flue gases 8 is in practice so low that the reaction between the oxide of calcium and/or magnesium and sulfur dioxide is rather weak, and under those conditions the oxides can be regarded as relatively inactive in terms of sulfur removal. However, the flue gases 8 can be used in a heat exchanger 12 to heat the air 5 to be fed into the boiler.

The flue gases 8 which emerge from the combustion chamber of the boiler 1 and contain calcium oxide and/or magnesium oxide and also contain sulfur dioxide are thereafter directed to a reactor, which is generally indicated by reference numeral 2. In order to activate the calcium oxide and/or magnesium oxide, an aqueous solution 9' is sprayed into the flue gases in the reactor 2; the water reacts with the newly formed native oxide of calcium and/or magnesium, forming the respective hydroxide, which is highly reactive. The hydroxide for its part reacts in situ with the sulfur dioxide remaining in the flue gases 8, thereby forming the respective sulfite, which further, in the presence of oxygen, is at least partly oxidized, forming the respective sulfate. The amount of the water 9 fed into the reactor 2 is adjusted to so low a level that the heat of the flue gases 8 suffices to evaporate it. In this case the dry, dust-like reaction product can be removed in the manner of other dust in a conventional dust separator 3, such as an electric filter or a bag filter, from which the flue gases 11 are further directed to a scrubber 13, and the separated dust 10 is recovered.

At a point before the scrubber 13, water can be fed into the flue gases via a pipe 16, and in the scrubber 13 itself, which is preferably of the type described in FI Patent 58443, the flue gases are scrubbed with a cycled scrubbing solution 9, which is trickled over the entire cross-sectional area of the scrubber. In addition, some amount of fresh alkali solution 15 is fed into the scrubber, and the purified flue gases 14 are removed from the upper section of the scrubber 13 and directed to the flue. Part of the cycled scrubbing solution 9 is separated and directed via the pipe 9' to the reactor 2, where the water present in the scrubbing solution evaporates and reacts with the calcium oxide and/or magnesium oxide arriving together with the flue gases 8, thereby forming a highly reactive hydroxide.

The apparatus disclosed for carrying out the process according to the invention is economical with respect to both its investment cost and operating costs, and a high degree of sulfur dioxide reduction is achieved by using it with a small lime excess and without having to add a large quantity of expensive sodium hydroxide 15. The amount of residue emerging from the dust separator 3 is also very moderate, and it is recovered in the form of a dry dust 10, which need not be evaporated or crystallized, and thus need not necessarily be treated further.

EXAMPLE

To compare the process according to the invention with the above-mentioned LIFAC process, a trial run was carried out using the apparatus depicted in the drawing and using an apparatus which was the same in all other respects except that the scrubber 13 had been eliminated and that only water was fed into the reactor 2.

In both processes, lime and coal, the rate of which was 110 tonnes/h and the sulfur content of which was 1.5% by weight, were fed into a boiler (800 MW$_t$), whereupon a flue gas having an SO$_2$ content of 3000 mg/m$^3$ and a temperature of 130° C. was obtained from the boiler. After activation, the temperature of the flue gases was 70° C., at which temperature the gases were directed to the electric filter. The aim in each process was to achieve a sulfur dioxide separation of 87%, which in most cases is sufficient and meets the standards.

In order to achieve this degree of sulfur dioxide separation, in the state-of-the-art LIFAC process it was necessary to feed into the boiler large amounts of lime, 20 tonnes/h, whereupon respectively a large amount of ashes was obtained.

In the process according to the invention, an aqueous solution of alkali was fed at 0.4 tonnes/h (calculated as 100% alkali) into the scrubber subsequent to the electric filter, in which case lime did not need to be fed into the boiler at a rate higher than only 10 tonnes/h. With this amount of lime, 70% of the sulfur dioxide was removed from the flue gases, and the remaining 17% was removed in the scrubber by using a small amount of alkali. At the same time the amount of ashes decreased considerably. In this process, part of the cycled solution from the scrubber was directed to the reactor, in which the water of the solution evaporated, cooling the flue gases from 130° C. to 70° C., at the same time reacting with the CaO present in the flue gases and forming a highly active Ca(OH)$_2$.

For an expert in the art it is evident that the scrubbing solution can also be fed into the boiler in order to vaporize the water present in the scrubbing solution; however, when entering the reactor together with the flue gases, the water vapor reacts with the CaO to form Ca(OH)$_2$ and at the same time activates it. From the viewpoint of the invention it is thus irrelevant whether the scrubbing solution to be evaporated is fed into the boiler or directly into the reactor.

We claim:

1. A process for the removal of sulfur dioxide from hot flue gases (8) which have been obtained by burning a sulfur-containing substance (4) in a boiler (1), by feeding into the boiler or into a reaction zone (2) subsequent to it carbonates or oxides of alkaline earth metals (6) which react with sulfur dioxide to form solid sulfite and sulfate reaction products by cooling the flue gases (8) in the reaction zone (2) by feeding into it at maximum such an amount of water as the hot flue gases are capable of evaporating, and by separating (3) the substantially dry products (10) from the cooled flue gases, characterized in that the flue gases (11) thus obtained are scrubbed (13) with an alkaline aqueous solution (15) in order to remove the remaining sulfur dioxide and dust from the flue gases, and part (9') of the cycled scrubbing solution (9) is directed to the boiler (1) or the reaction zone (2) in order to evaporate the water from this solution.

2. A process according to claim 1, characterized in that so large an amount (9') of the cycled scrubbing solution (9) is fed into the reaction zone (2) that the water contained in it suffices for the cooling of the hot flue gases (8) and for the activating of the carbonates or oxides of alkaline earth metals which reacts with the sulfur dioxide present in them.

* * * * *